United States Patent
Hsieh et al.

(10) Patent No.: US 7,631,129 B2
(45) Date of Patent: Dec. 8, 2009

(54) COMPUTER MONITORING SYSTEM AND MONITORING METHOD

(75) Inventors: Ming-Chih Hsieh, Taipei Hsien (TW); Kuang-Lung Ko, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 66 days.

(21) Appl. No.: 11/962,118

(22) Filed: Dec. 21, 2007

(65) Prior Publication Data

US 2009/0150652 A1    Jun. 11, 2009

(30) Foreign Application Priority Data

Dec. 10, 2007    (CN)    ................. 2007 1 0202959

(51) Int. Cl.
*G06F 13/00* (2006.01)
(52) U.S. Cl. .................... 710/107; 710/305; 714/23
(58) Field of Classification Search ............. 710/107, 710/305, 306, 313, 316; 714/11, 13, 23
See application file for complete search history.

(56) References Cited

U.S. PATENT DOCUMENTS

| | | | | |
|---|---|---|---|---|
| 5,450,576 A | * | 9/1995 | Kennedy | .................. 713/2 |
| 6,226,556 B1 | * | 5/2001 | Itkin et al. | .................. 700/21 |
| 6,393,582 B1 | * | 5/2002 | Klecka et al. | .................. 714/11 |
| 6,493,593 B1 | * | 12/2002 | Kamiya et al. | .................. 700/2 |

* cited by examiner

*Primary Examiner*—Glenn A Auve
(74) *Attorney, Agent, or Firm*—Frank R. Niranjan

(57) ABSTRACT

An exemplary computer monitoring system includes a central processing unit (CPU) connected to a computer, a first microprocessor, a second microprocessor, and a select switch connected to a terminal device. The CPU is connected to the select switch via the first microprocessor and the second microprocessor respectively for transmitting data. When one of the first and second microprocessors is halted, the other one of the first and second microprocessors is selected by the select switch under the control of the CPU. The CPU sends a reset signal to the halted microprocessor to reset it. A monitoring method using the computer monitoring system for improving stability and reliability of the computer monitoring system is disclosed.

6 Claims, 2 Drawing Sheets

COMPUTER MONITORING SYSTEM AND MONITORING METHOD

BACKGROUND

1. Field of the Invention

The present invention relates to monitoring systems and monitoring methods, and particularly to a computer monitoring system and a monitoring method using the monitoring system.

2. Description of Related Art

Referring to FIG. 2, a conventional computer monitoring system includes a computer 12, a monitor device 14, and a plurality of terminal devices 16 (for example: relay, camera, video camera, and annunciator).

The monitor device 14 includes a central processing unit (CPU) 142 and a microprocessor 144. The CPU 142 is connected to the computer 12 by net or corn port for transmitting data. The microprocessor 144 is connected to the terminal devices 16 by an input/output port thereof for transmitting data. The CPU 142 is connected to the microprocessor 144 for transmitting data. Therefore, the terminal devices 16 are connected to the computer 12 via the microprocessor 144 and the CPU 142. The CPU 142 is further connected to a reset terminal RESET of the microprocessor 144 for resetting the microprocessor 144 when the microprocessor is halted.

This kind of monitoring system has a drawback in that data transmission is interrupted when the microprocessor is resetting.

SUMMARY

An exemplary computer monitoring system comprises a central processing unit (CPU) for connecting to a computer, having a first, a second, and a third output terminals; a first microprocessor connected to the CPU, having an output terminal and a reset terminal connected to the first output terminal of the CPU for receiving a reset signal; a second microprocessor connected to the CPU, having an output terminal and a reset terminal connected to the second output terminal of the CPU for receiving the reset signal; and a select switch having two input terminals connected to the output terminal of the first and second microprocessor respectively, a control terminal connected to the third output terminal of the CPU for receiving a control signal, and an output terminal for connecting to at least one terminal device, the input terminals of the select switch selectively connected to the output terminal thereof under the control of the control signal.

Other advantages and novel features of the present invention will become more apparent from the following detailed description of preferred embodiment when taken in conjunction with the accompanying drawings, in which:

DETAILED DESCRIPTION

Figure 1:
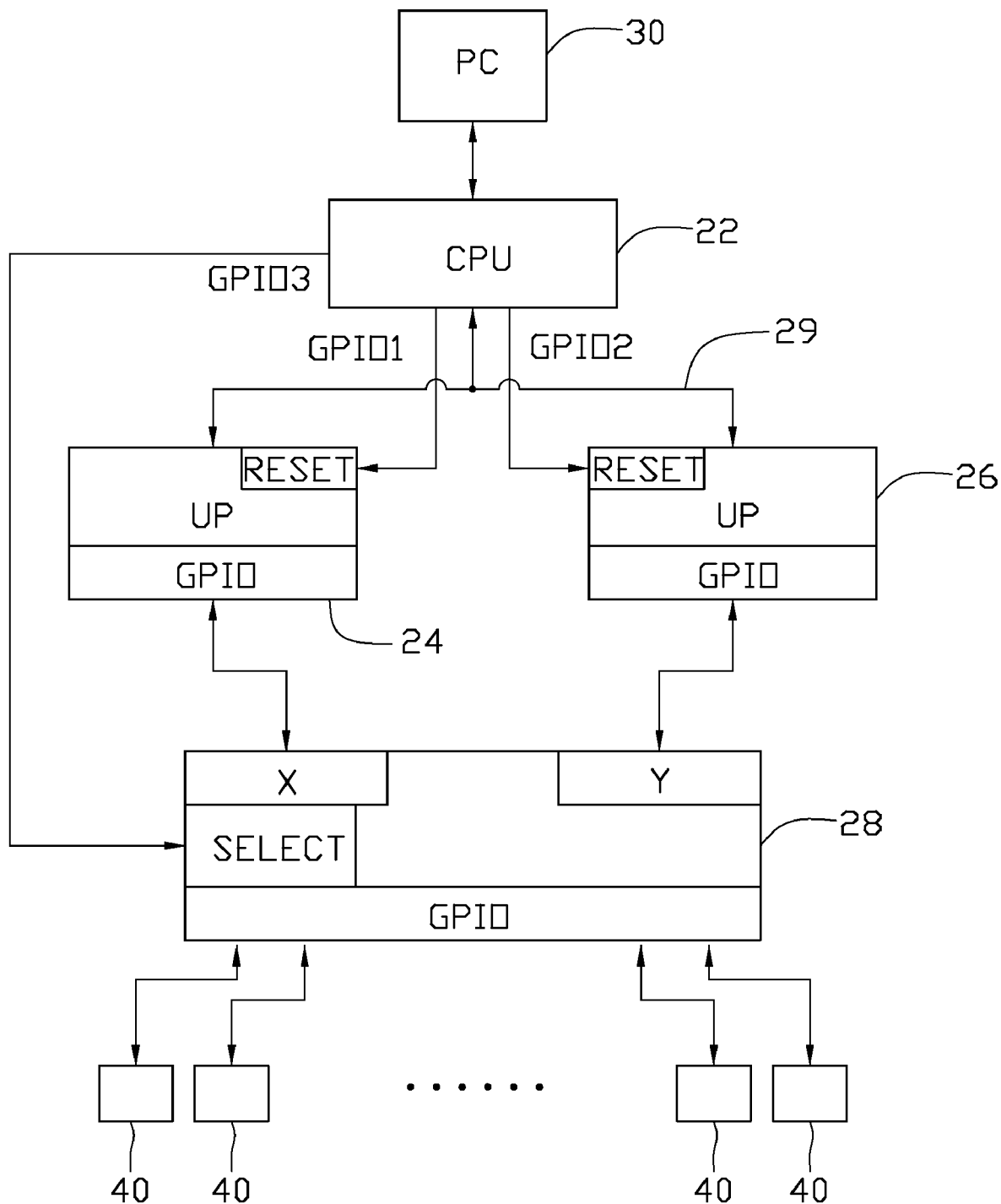
FIG. 1 is a circuit diagram of a computer monitoring system in accordance with an embodiment of the present invention.
Figure 2:
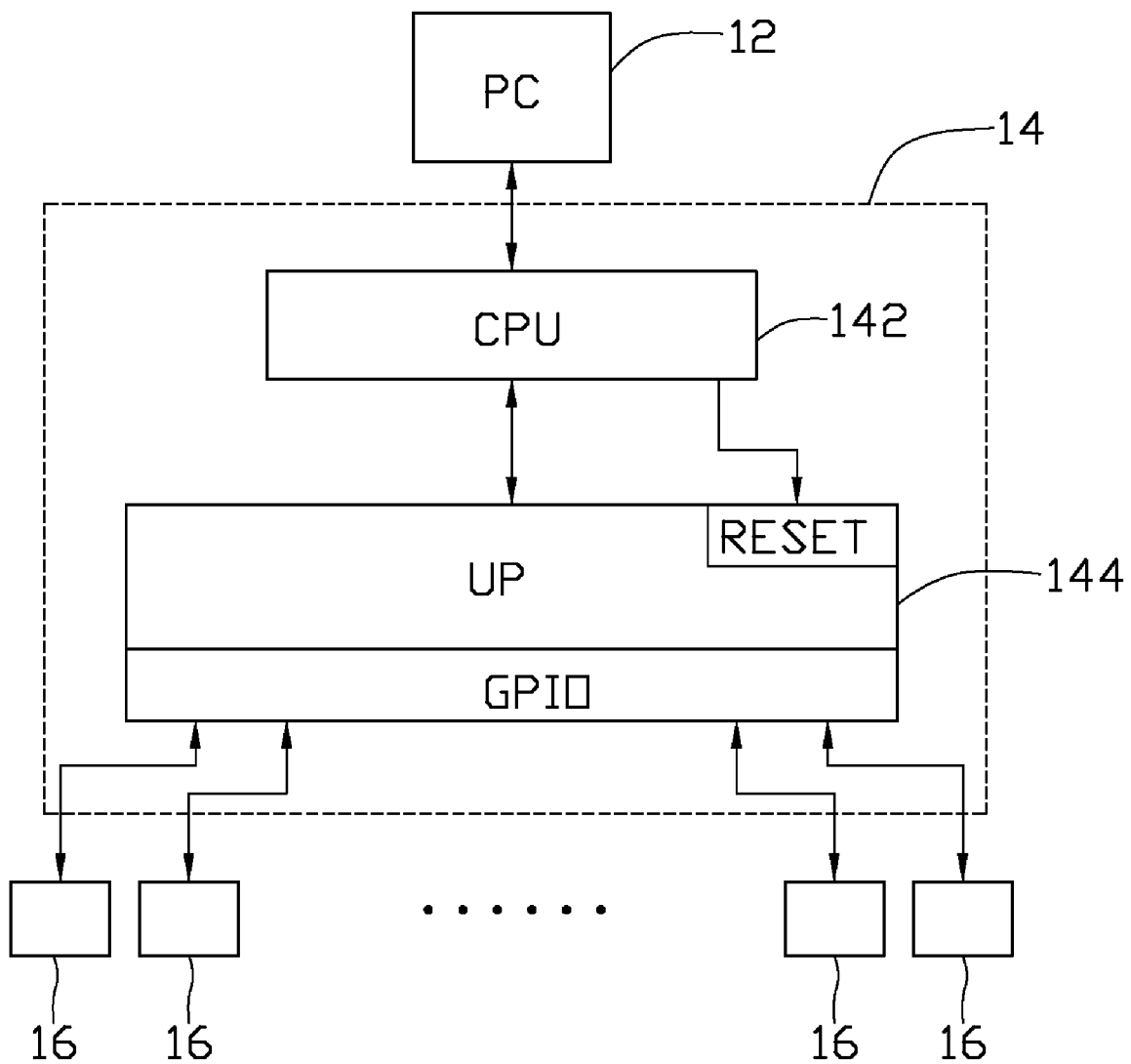
FIG. 2 is a circuit diagram of a conventional computer monitoring system.

Referring to FIG. 1, a computer monitoring system in accordance with an embodiment of the present invention includes a central processing unit (CPU) 22 having three output terminals GPIO1~GPIO3, a first microprocessor 24 having an output terminal GPIO and a reset terminal RESET, a second microprocessor 26 having an output terminal GPIO and a reset terminal RESET, and a select switch 28 having two input terminal X and Y, an output terminal GPIO, and a control terminal SELECT.

The CPU 22 is connected to a computer 30 via a com port and connected to the first microprocessor 24 and the second microprocessor 26 via a bus 29 for transmitting data. The output terminals GPIO1 and GPIO2 of the CPU 22 are connected to the reset terminals RESET of the first microprocessor 26 and the second microprocessor 28 respectively. The output terminal GPIO3 of the CPU is connected to the control terminal SELECT of the select switch 28. The output terminals GPIO of the first and the second microprocessors 24 and 26 are connected to the input terminals X and Y respectively. The output terminal of the select switch 28 is connected to a plurality of terminal devices 40. The first microprocessor 24, the second microprocessor 26, and the select switch 28 are controlled by the CPU 22.

A monitoring method using the computer monitoring system includes steps of: outputting a control signal to the select terminal SELECT of the select switch 28 via the output terminal GPIO3 of the CPU 22 to make the input terminal X couple to the output terminal GPIO thereof, for coupling the first microprocessor 24 to the terminal devices 40; transmitting data between the CPU 22 and the first microprocessor 24; outputting a control signal to the select terminal SELECT of the select switch 28 via the output terminal GPIO3 of the CPU 22 to make the input terminal Y couple to the output terminal GPIO thereof, for coupling the second microprocessor 26 to the terminal devices 40, when the first microprocessor 24 is halted, and then outputting a reset signal to the first microprocessor 24 via the output terminal GPIO1 to reset the first microprocessor 24; transmitting data between the CPU 22 and the first microprocessor 24; and outputting a control signal to the select terminal SELECT of the select switch 28 via the output terminal GPIO3 of the CPU 22 to make the input terminal X couple to the output terminal GPIO thereof, for coupling the first microprocessor 24 to the terminal devices 40, when the second microprocessor 26 is halted, and then outputting the reset signal to the second microprocessor 26 via the output terminal GPIO2 to reset the second microprocessor 26.

Therefore, when one of the first and second microprocessors 24 and 26 is halted, the other one of the first and second microprocessors 24 and 26 is coupled to the CPU 22 via the select switch 28. The CPU 22 sends the reset signal to the microprocessor, which is halted, to reset it.

In another embodiment of the invention, the CPU 22 sends a detecting signal to the microprocessor, which is halted, after sending the reset signal thereto, for detecting whether the processor which is halted is reset by the reset signal. If the processor, which is halted, is not reset by the reset signal, the CPU 22 sends an alarm signal to the computer 30 to indicate that the microprocessor did not reset.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A computer monitoring system comprising:
   a central processing unit (CPU) for connecting to a computer, the CPU having a first, a second, and a third output terminals;
   a first microprocessor connected to the CPU, the first microprocessor having an output terminal and a reset terminal, wherein the reset terminal is connected to the first output terminal of the CPU for receiving a reset signal;
   a second microprocessor connected to the CPU, the second microprocessor having an output terminal and a reset terminal, wherein the reset terminal is connected to the second output terminal of the CPU for receiving the reset signal; and
   a select switch having two input terminals connected to the output terminal of the first and second microprocessor respectively, a control terminal connected to the third output terminal of the CPU for receiving a control signal, and an output terminal for connecting to at least one terminal device, the input terminals of the select switch selectively connected to the output terminal thereof under the control of the control signal.

2. The computer monitoring system as claimed in claim 1, wherein the CPU is connected to the first and the second microprocessors by a bus.

3. A monitoring method using the computer monitoring system as claimed in claim 1 comprising steps of:
   the CPU generating the control signal to couple the first microprocessor to the at least one terminal device; and
   the CPU generating the control signal to couple the second microprocessor to the at least one terminal device, and sending the reset signal to the first microprocessor, when the first microprocessor is halted.

4. The computer monitoring method as claimed in claim 3, wherein the CPU sends a detecting signal to the first microprocessor after sending the reset signal thereto, if the first microprocessor is not reset by the reset signal, the CPU sends an alarm signal to the computer to indicate that the first microprocessor did not reset.

5. The computer monitoring method as claimed in claim 3 further comprising a step of: the CPU generating the control signal to couple the first microprocessor to the at least one terminal device, and sending the reset signal to the second microprocessor, when the second microprocessor is halted.

6. The computer monitoring method as claimed in claim 5, wherein the CPU sends a detecting signal to the second microprocessor after sending the reset signal thereto, if the second microprocessor is not reset by the reset signal, the CPU sends an alarm signal to the computer to indicate that the second microprocessor did not reset.

* * * * *